United States Patent
Malrait et al.

(10) Patent No.: US 10,554,155 B2
(45) Date of Patent: Feb. 4, 2020

(54) CONTROL METHOD FOR VERIFYING THE COMPATIBILITY BETWEEN A VARIABLE SPEED DRIVE AND THE INPUT FILTER

(71) Applicant: Schneider Toshiba Inverter Europe SAS, Pacy sur Eure (FR)

(72) Inventors: Francois Malrait, Jouy sur Eure (FR); Mehdi Messaoudi, Vernon (FR)

(73) Assignee: SChneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 16/132,659

(22) Filed: Sep. 17, 2018

(65) Prior Publication Data

US 2019/0097550 A1 Mar. 28, 2019

(30) Foreign Application Priority Data

Sep. 28, 2017 (FR) ...................... 17 71025

(51) Int. Cl.
*H02P 1/28* (2006.01)
*H02P 27/06* (2006.01)
*H02P 29/032* (2016.01)

(52) U.S. Cl.
CPC .............. *H02P 1/28* (2013.01); *H02P 27/06* (2013.01); *H02P 29/032* (2016.02)

(58) Field of Classification Search
CPC .................................. H02P 1/28; H02P 27/06
USPC ............... 318/801, 800, 799, 798, 767, 727
See application file for complete search history.

(56) References Cited

U.S. PATENT DOCUMENTS

| 4,364,004 A * | 12/1982 | Bourbeau ............... H02P 25/03 318/721 |
| 5,089,760 A | 2/1992 | Joyner, Jr. |
| 6,229,278 B1 | 5/2001 | Garces et al. |
| 2012/0256580 A1 | 10/2012 | Yu et al. |

OTHER PUBLICATIONS

French Preliminary Search Report dated May 3, 2018 in French Application 17 71025 filed on Sep. 28, 2017 (with English Translation of Categories of Cited Documents and Written Opinion).
Behrooz Bahrani, et al., "Investigation of Harmonic Filtering for the State-of-the-art Variable Speed Drives," 13$^{th}$ European Conference on Power Electronics and Applications, 2009, pp. 1-10.

(Continued)

*Primary Examiner* — David Luo
(74) *Attorney, Agent, or Firm* — Oblon, McClelland, Maier & Neustadt, L.L.P.

(57) ABSTRACT

A control method for verifying the compatibility between an input filter and a variable speed drive. The method includes applying a plurality of successive commands so as to define a plurality of operating points of the electric motor, for each operating point, measuring the DC voltage of the bus, comparing the maximum variation in the amplitude of the DC voltage measured for the operating point with a threshold value, defining a new operating point as long as the maximum variation in the amplitude of the DC voltage is lower than the threshold value, determining an operating range including all of the operating points for which the maximum variation in the amplitude of the DC voltage is lower than the threshold value.

14 Claims, 3 Drawing Sheets

(56) References Cited

OTHER PUBLICATIONS

Johann W. Kolar, et al., "A Comprehensive Design Approach for a Three-Phase High-Frequency Single-Switch Discontinuous-Mode Boost Power Factor Corrector Based on Analytically Derived Normalized Converter Component Ratings," IEEE Transactions on Industry Applications, vol. 31, No. 3, 1995, pp. 569-582.

\* cited by examiner

CONTROL METHOD FOR VERIFYING THE COMPATIBILITY BETWEEN A VARIABLE SPEED DRIVE AND THE INPUT FILTER

TECHNICAL FIELD OF THE INVENTION

The present invention relates to a control method implemented in order to verify the compatibility between an input filter and a variable speed drive.

The invention also relates to a control system configured to implement said method.

PRIOR ART

In a known manner, an electric motor may be controlled using a variable speed drive. The variable speed drive is connected to the electrical network and is controlled by a control unit so as to supply a variable voltage to the electric motor. To ensure filtering of the harmonics coming from the electrical network, an input filter is inserted between the variable speed drive and the network. This filter may take various forms and operate according to various principles. It may be for example an anti-harmonics filter or a harmonics compensation filter.

It has been observed that the presence of such an input filter may lead to instabilities at the DC bus of the variable speed drive that is connected thereto. These instabilities lead to premature ageing of the capacitors of the DC bus of the variable speed drive, and therefore to failures of the variable speed drive.

One solution for the quick starting of an electric motor has been proposed in patent application US2012/256580A1 and one solution for monitoring the voltage present on the DC bus of a variable speed drive has been proposed in patent U.S. Pat. No. 6,229,278B1. However, these solutions are not able to be transposed to the determination of the compatibility between an input filter and a variable speed drive. Simply measuring the voltage on the bus and comparing it with a threshold value does not correspond to an unstable state of the system and is not sufficient to make a decision with regard to the compatibility or the incompatibility of the input filter with the variable speed drive.

The aim of the invention is therefore to propose a simple and reliable solution that makes it possible to ensure that the input filter is indeed compatible with the variable speed drive that is used to control the electric motor and possibly to determine the operating range over which the electric motor is able to be controlled.

SUMMARY OF THE INVENTION

This aim is achieved by a control method for verifying the compatibility between an input filter and a variable speed drive, said variable speed drive being connected to an electric power source via said input filter, said variable speed drive comprising, at input, a rectifier stage connected to said input filter, a DC power supply bus connected to said rectifier stage and receiving a DC supply voltage, and, at output, an inverter stage connected to the DC power supply bus and controlled so as to supply a variable voltage to an electric motor, said method consisting in:
Applying a plurality of successive commands so as to define a plurality of operating points of the electric motor,
For each operating point:
Measuring the DC voltage of the bus,
Comparing the maximum variation in the amplitude of the DC voltage measured for said operating point with a threshold value,
Defining a new operating point as long as said maximum variation in the amplitude of the DC voltage is lower than said threshold value,
Determining an operating range comprising all of the operating points for which said maximum variation in the amplitude of the DC voltage is lower than said threshold value.

Combining the filter with the variable speed drive may make the bus 'resonate', and excessively strong voltage oscillations may break the bus capacitor of the variable speed drive. Thus, detecting 'variations' in the voltage of the bus, that is to say forced oscillations of high amplitude, makes it possible to trigger a warning, and possibly to trigger a fallback mode, while waiting for the filter to be changed with another reference.

According to one particular feature, the method includes a step of implementing a control path that makes it possible to define said operating points.

According to another particular feature, said control path follows successive increments, each increment making it possible to define a separate operating point.

According to another particular feature, said control path is a reference motor frequency path.

According to another particular feature, the method includes a step of defining a new operating point on the basis of a difference between the maximum variation in the amplitude of the DC voltage measured for said operating point and the threshold value.

According to another particular feature, the method includes a step of determining an upper limit, in terms of operating point, of a compatibility of the combination of the input filter with the variable speed drive.

According to another particular feature, the method includes a step of determining a lower limit, in terms of operating point, of a compatibility of the combination of the input filter with the variable speed drive.

The invention also relates to a control system for verifying the compatibility between an input filter and a variable speed drive, said variable speed drive being connected to an electric power source via said input filter, said variable speed drive comprising, at input, a rectifier stage connected to said input filter, a DC power supply bus connected to said rectifier stage and receiving a DC supply voltage, and, at output, an inverter stage connected to the DC power supply bus and controlled so as to supply a variable voltage to an electric motor, said system being configured to apply a plurality of successive commands so as to define a plurality of operating points of the electric motor and including:
For each operating point:
Means for measuring the DC voltage of the bus,
A module for comparing the maximum variation in the amplitude of the DC voltage measured for said operating point with a threshold value,
A module for determining a new operating point as long as said maximum variation in the amplitude of the DC voltage is lower than said threshold value,
A module for determining an operating range comprising all of the operating points for which said maximum variation in the amplitude of the DC voltage is lower than said threshold value.

According to one particular feature, the system includes a module for applying a control path that makes it possible to define said operating points.

According to another particular feature, said control path follows successive increments, each increment making it possible to define a separate operating point.

According to another particular feature, said control path is a reference motor frequency path.

According to another particular feature, the system includes a module for determining a new operating point on the basis of a difference between the maximum variation in the amplitude of the DC voltage measured for said operating point and the threshold value.

According to another particular feature, the system includes a module for determining an upper limit, in terms of operating point, of a compatibility of the combination of the input filter with the variable speed drive.

According to another particular feature, the system includes a module for determining a lower limit, in terms of operating point, of a compatibility of the combination of the input filter with the variable speed drive.

BRIEF DESCRIPTION OF THE FIGURES

Other features and advantages will appear in the following detailed description, given with reference to the appended drawings, in which.

DETAILED DESCRIPTION OF AT LEAST ONE EMBODIMENT

Figure 1:
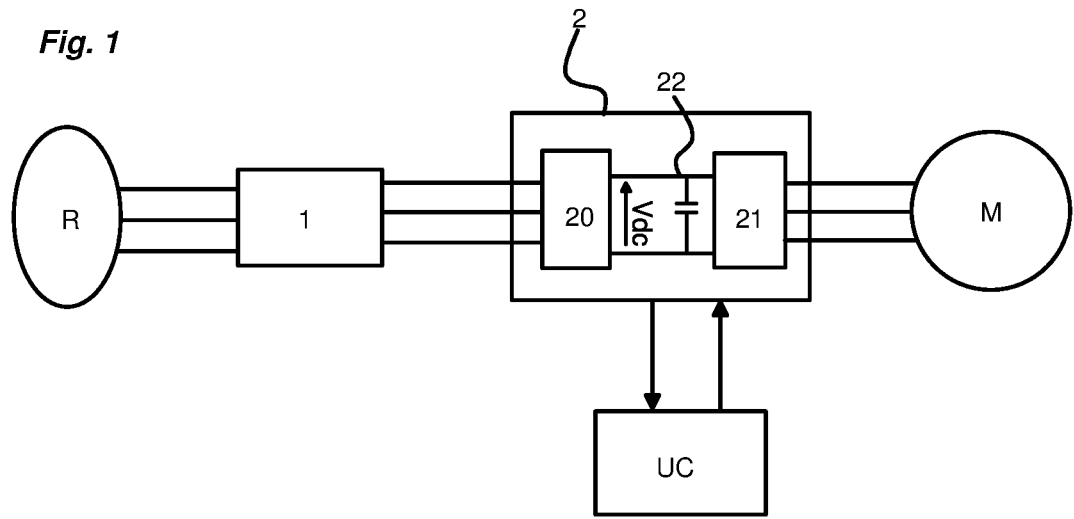
FIG. 1 schematically shows an architecture for controlling an electric motor.

As described above, the invention aims to make it possible to verify the compatibility between a variable speed drive and the filter connected at the input thereof. It also makes it possible to ascertain the operating range over which the variable speed drive 2 and the input filter 1 are compatible with one another.

In a nonlimiting manner, a variable speed drive 2 conventionally includes:

A rectifier stage 20 connected to an electric power source (the electrical network R) so as to receive an AC voltage; the rectifier may be of passive type, such as a diode bridge, or active type, based on controlled transistors;

A DC power supply bus 22 to which the voltage Vdc rectified by the rectifier stage 20 is applied and comprising in particular two bus lines and at least one bus capacitor that is connected between the two lines so as to stabilize the DC voltage Vdc of the bus;

An inverter stage 21 connected at the output of the DC bus 22 and intended to switch the DC voltage Vdc supplied by the bus to a variable voltage intended for the electric motor M; the inverter stage 21 includes a plurality of switching arms each including power transistors controlled so as to apply the variable voltage to the electric motor.

The variable speed drive advantageously incorporates a control unit UC intended to control the transistors of the inverter stage 21. The control unit UC draws on a control law in order to determine the voltages to be applied to the electric motor M; the control law may in particular be of vector or scalar type.

The variable speed drive 2 includes a plurality of output phases (in general three phases) linking each arm of the inverter stage 21 to a separate winding of an electric motor M and a plurality of input phases (three input phases in FIG. 1) connecting it to the electric power source, in general the electrical network R.

To filter the harmonics, an input filter 1 is connected to the input phases of the variable speed drive 2 and is inserted between the network R and the variable speed drive 2.

Figure 2:
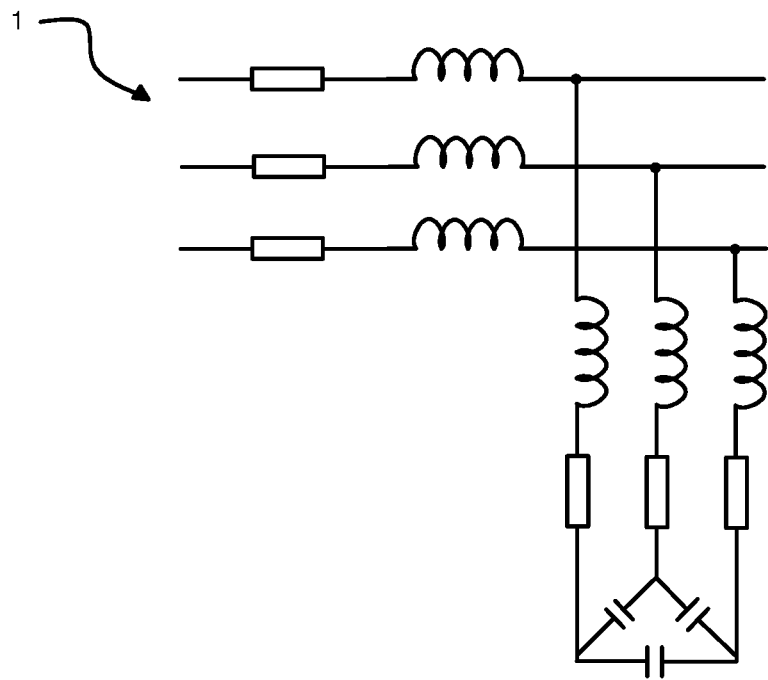
FIG. 2 shows an example of an input filter able to be connected at the input of a variable speed drive.

This input filter 1 may for example adopt the configuration shown in FIG. 2. In a known manner, it is formed of a plurality of circuits of RLC type appropriately connected to each of the input phases of the variable speed drive. Any other conventional configuration could be used.

The control method described below applies regardless of the filter 1 that is present at input and regardless of the type of electric motor M (synchronous, asynchronous, etc.) that is connected to the output of the variable speed drive.

The control method of the invention is implemented in accordance with two possible embodiments.

It is implemented by a control system comprising control means and means for measuring the DC voltage Vdc of the bus of the variable speed drive.

The control means are configured to execute one or more software modules that are intended to implement one or more of the steps of the method.

The control means responsible for executing the control steps are for example integrated into the control unit UC of the variable speed drive 2.

The control method may be executed when the variable speed drive 2 is first powered up, or at any other moment, for example when replacing the input filter.

Generally, the method consists in scanning a plurality of operating points of the electric motor M by virtue of the variable speed drive 2 and in measuring the DC voltage Vdc of the bus 22 of the variable speed drive for each of these operating points. This will then involve comparing the maximum variation $\Delta V_{dc\_m}$ in the amplitude of the measured DC voltage with a threshold value $\Delta V_{dc\_ref}$.

'Variation' is understood to mean the amplitude of the oscillations of the DC voltage Vdc of the bus, that is to say the voltage Vdc (fundamental)+the variations DV *sin(2 πft), and not the normal variation in the term Vdc (fundamental).

In the present application, the concept of an operating point should be understood in electrical terms (voltage, current) or in mechanical terms (torque, speed, position). In other words, in electrical terms, the variable speed drive supplies a voltage (defined by an amplitude and a phase—stator frequency or called motor frequency). In mechanical terms, the monitoring of the variable speed drive translates a torque and speed reference into a voltage that, applied to the electric motor, makes it possible to generate a mechanical torque at the electric motor.

An operating point has to be perfectly defined and stable, be this in terms of the electrical variables or in terms of the mechanical variables.

The threshold value $\Delta V_{dc\_ref}$ will be defined on the basis of the manufacturer data defined so as to protect the components of the variable speed drive.

By virtue of the principle of the invention, it is possible to determine the operating range over which the variable speed drive is able to be controlled without leading to instabilities.

Figure 3A:
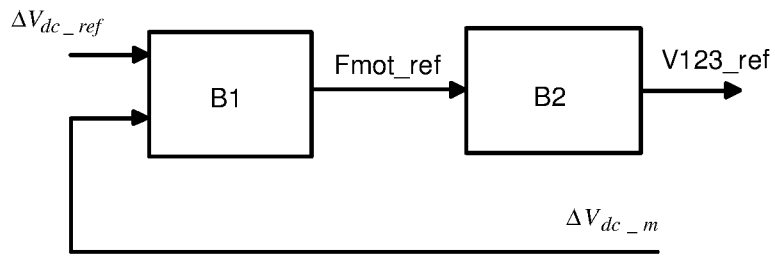
FIGS. 3A to 3C schematically illustrate the principle of the control method of the invention, according to a first embodiment.
Figure 3B:
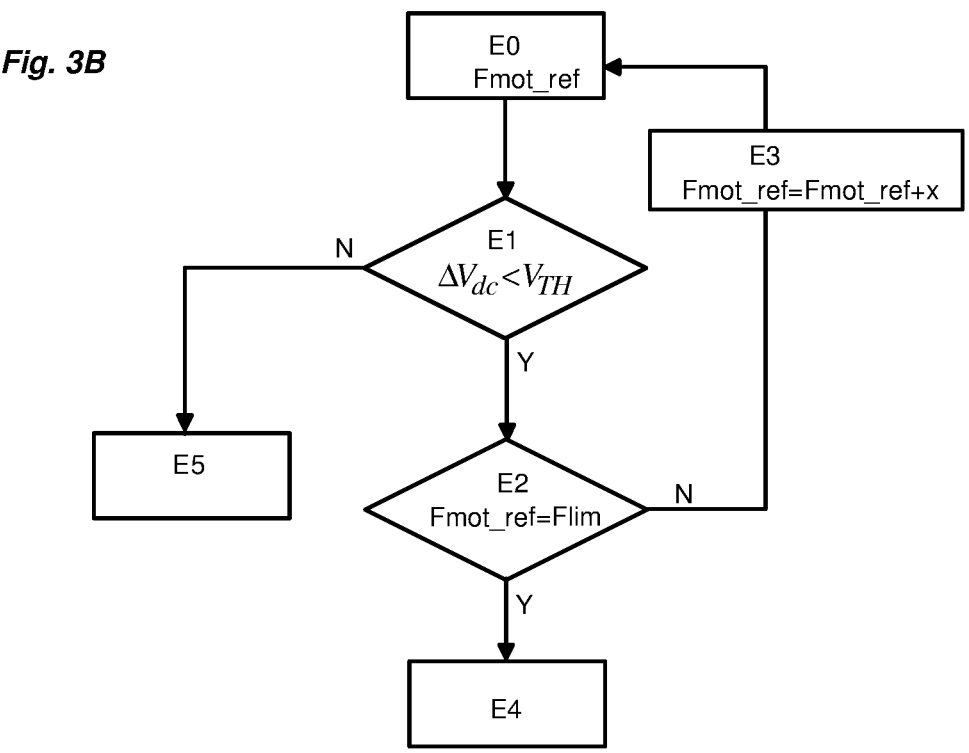
Figure 3C:
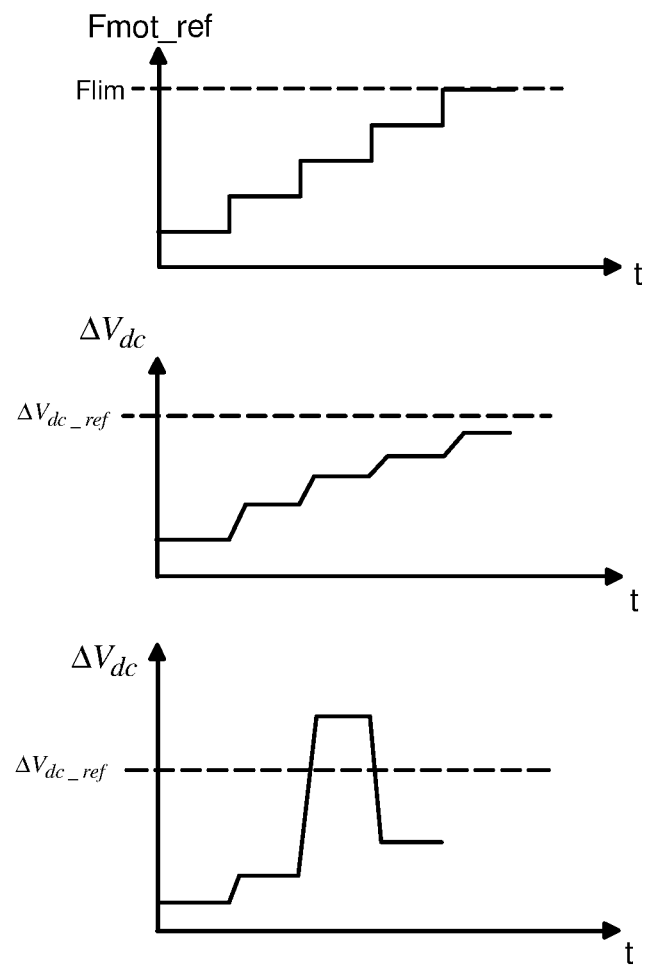
Figure 4:
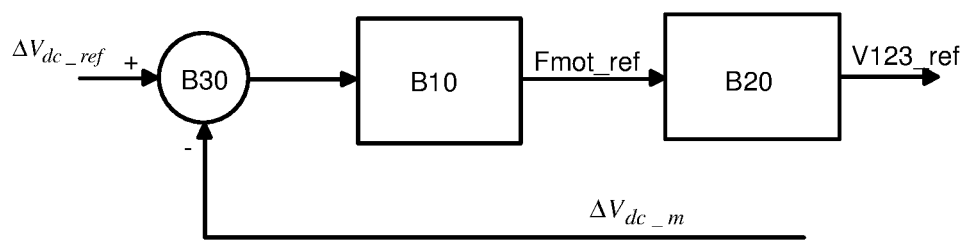
FIG. 4 schematically illustrates the principle of the control method of the invention, according to a second embodiment.

With reference to FIGS. 3 and 4, two approaches are possible.

In the first approach, this involves running through the operating points of the electric motor and verifying the compatibility of the input filter+variable speed drive combination for each of these operating points.

In the second approach, this involves determining the validity limits, in terms of operating point, of the input filter+variable speed drive combination.

First approach

In the first approach, the principle of the control method that is implemented is outlined in FIG. 3A.

The control structure includes:

A control block B1 responsible for generating a reference path at the motor frequency (Fmot_ref). This control block B1 receives, at input, the maximum variation $\Delta_{dc\_m}$ in the amplitude of the measured DC voltage and a threshold value $\Delta V_{dc\_ref}$ defined as the limit value for which the input filter+variable speed drive combination is no longer valid.

A standard monitoring block B2 receiving, at input, the reference motor frequency Fmot_ref generated by the control block B1 following the followed path. This standard monitoring block B2 applies a standard monitoring law in order to determine the control voltages V123_ref to be applied to the electric motor that is connected to the output phases of the variable speed drive.

The control block B1 operates in accordance with the algorithm shown in FIG. 3B. This algorithm is as follows:

a) In a step E0, it generates a first reference motor frequency Fmot_ref along the provided path, this reference motor frequency corresponding to a first operating point of the electric motor.

b) In a following step, the measurement means measure the DC voltage Vdc of the bus of the variable speed drive for this first operating point.

c) In a step E1, a comparison module compares the maximum variation $\Delta V_{dc\_m}$ in the amplitude of the measured DC voltage of the bus with the determined threshold value $\Delta V_{dc\_ref}$.

d) In a step E2, if the measured maximum variation $\Delta V_{dc\_m}$ is lower than said threshold value $\Delta V_{dc\_ref}$, the control block B1 then verifies, using a verification module, whether the upper motor frequency limit Flim of the path is reached.

e) If the upper limit Flim is not yet reached, the control block B1 restarts steps a) to d) while changing the reference motor frequency (Fmot_ref+x) applied at input along the followed control path (step E3).

f) If the upper limit Flim is reached, the control block B1 may conclude therefrom that the input filter+variable speed drive combination is valid over the entire operating range (step E4).

g) If the measured maximum variation $\Delta V_{dc\_m}$ is greater than said threshold value $\Delta V_{dc\_ref}$, the control block B1 concludes therefrom that the input filter+variable speed drive combination is not advisable for operation at this motor frequency (step E5).

As the path generated at input is an increasing (or decreasing) path, the control block is able to determine, using an appropriate module, the motor frequency starting at which the input filter+variable speed drive combination is no longer advisable, or in other words to determine the upper (respectively lower) operating limit of the input filter+variable speed drive pair.

The path followed by the reference motor frequency Fmot_ref may include an upper limit Flim for which it is considered that the entire operating range of the electric motor is covered. When this upper limit Flim is reached and step d) is verified, the control block B1 may conclude therefrom that the entire operating range is covered and that the input filter+variable speed drive combination is valid overall.

The path of the reference motor frequency Fmot_ref may follow any determined profile, starting from the moment when a plurality of successive operating points are defined at the electric motor M. It may for example be a path including a plurality of successive frequency increments, a path that follows a given gradient or any other possible path that makes it possible to cover the operating range.

FIG. 3C shows, in the first graph, an example of a path with successive increments that is followed by the reference motor frequency Fmot_ref.

In this FIG. 3C, the second graph shows the evolution of the maximum variation $\Delta V_{dc\_m}$ in the amplitude of the DC voltage of the bus for each reference frequency Fmot_ref increment applied at input. In this graph, the maximum variation $\Delta V_{dc\_m}$ still remains lower than the threshold value $\Delta V_{dc\_ref}$, thereby allowing the control block B1 to conclude the compatibility of the input filter 1 with the variable speed drive 2.

In FIG. 3C, the third graph shows the evolution of the maximum variation $\Delta_{dc\_m}$ in the amplitude of the DC voltage of the bus for each reference frequency Fmot_ref increment applied at input. In this third graph, it may be seen that the maximum variation $\Delta V_{dc\_m}$ exceeds the threshold value $\Delta V_{dc\_ref}$ for an operating point. The result of this is that the input filter+variable speed drive combination is not valid over the entire operating range.

At the end of the implementation of the algorithm, the control unit UC is able to define the operating range for which the input filter+variable speed drive combination is valid.

Second Approach

In this second approach, the control method consists of a regulation loop that makes it possible to directly determine the lower limit, in terms of motor frequency (or in other words of operating point), of the compatibility of the input filter+variable speed drive combination and the upper limit, in terms of motor frequency, of the compatibility of the input filter+variable speed drive combination.

With reference to FIG. 4, for this second approach, the control structure includes:

A comparison block B30 that makes it possible to determine the difference between the maximum variation $\Delta V_{dc\_m}$ in the amplitude of the DC voltage of the bus that has been measured and the threshold value $\Delta V_{dc\_ref}$.

A regulation block B10 receiving, at input, said determined difference and executing a conventional controller. On the basis of the difference injected at input, the regulation block B10 determines the reference motor frequency Fmot_ref to be applied in order to make the maximum variation $\Delta V_{dc\_m}$ in the amplitude of the measured DC voltage converge towards the threshold value $\Delta V_{dc\_ref}$.

A standard monitoring block B20 receiving, at input, the reference motor frequency Fmot_ref determined by the regulation block B10. This standard monitoring block B20 applies a standard monitoring law in order to determine the control voltages V123_ref to be applied to the electric motor M that is connected to the output phases of the variable speed drive 2 on the basis of the reference motor frequency Fmot_ref received at input.

To determine the lower limit of the zone of instability, if the maximum variation $\Delta V_{dc\_m}$ in the DC voltage of the bus is lower than the threshold value $\Delta V_{dc\_ref}$ then the regulation block B10 will increase the reference motor frequency Fmot_ref, starting from a low initial value (starting from 0 Hz for example). This may be performed by various standard controllers, such as an all or nothing controller or a proportional-integral (PI) controller. By way of example:

For a PI controller, at each time step, we have: Fint=Fint+ KI×Ts ($\Delta V_{dc\_ref}-\Delta V_{dc\_m}$) and Fmot_ref=Fint+KP ($\Delta V_{dc\_ref}-\Delta V_{dc\_m}$). Where Fint: integral term, Ts: sampling time, KI: integral gain, KP: proportional gain.

To determine the upper limit of the zone of instability, if the maximum variation $\Delta V_{dc\_m}$ in the DC voltage of the bus is lower than the threshold value $\Delta V_{dc\_ref}$, then the regulation block B10 will decrease the reference motor frequency Fmot_ref, starting from a high initial value (starting from the nominal frequency for example). This may also be performed by various standard controllers, such as an all or nothing controller or a proportional-integral (PI) controller. By way of example:

For a PI controller, at each time step, we have: Fint=Fint− KI×Ts ($\Delta V_{dc\_ref}-\Delta V_{dc\_m}$) and Fmot_ref=Fint−KP ($\Delta V_{dc\_ref}-\Delta V_{dc\_m}$). Where Fint: integral term, Ts: sampling time, KI: integral gain, KP: proportional gain.

In this second approach, the reference motor frequency Fmot_ref is changed by the regulation block B20. There is no limit as to whether this block B20 supplies a continuous motor frequency variation or a discontinuous variation in successive increments.

This second approach therefore makes it possible to verify that the determined lower motor frequency limit and that the determined upper motor frequency limit indeed define the desired operating range for the variable speed drive in the monitoring of the electric motor.

The invention described above thus has a certain number of advantages, including:

Ease of implementation. It involves simply measuring the DC voltage of the bus and implementing the appropriate algorithm according to the first approach or the second approach;

Reliability that makes it possible to guarantee that the input filter+variable speed drive combination is indeed feasible over a sufficiently wide operating range;

An economic solution in that it makes it possible to avoid damaging the components of the variable speed drive.

The invention claimed is:

1. A control method for verifying the compatibility between an input filter and a variable speed drive, said variable speed drive being connected to an electric power source via said input filter, said variable speed drive comprising, at input, a rectifier stage connected to said input filter, a DC power supply bus connected to said rectifier stage and receiving a DC supply voltage, and, at output, an inverter stage connected to the DC power supply bus and controlled so as to supply a variable voltage to an electric motor, said method comprising:

applying a plurality of successive commands so as to define a plurality of operating points of the electric motor, for each operating point:
measuring the DC voltage of the bus,
comparing the maximum variation in the amplitude of the DC voltage measured for said operating point with a threshold value, defining a new operating point as long as said maximum variation in the amplitude of the DC voltage is lower than said threshold value, determining an operating range comprising all of the operating points for which said maximum variation in the amplitude of the DC voltage is lower than said threshold value.

2. The method according to claim 1, comprising a step of implementing a control path that makes it possible to define said operating points.

3. The method according to claim 2, wherein said control path follows successive increments, each increment making it possible to define a separate operating point.

4. The method according to claim 2, wherein said control path is a reference motor frequency path.

5. The method according to claim 1, comprising a step of defining a new operating point on the basis of a difference between the maximum variation in the amplitude of the DC voltage measured for said operating point and the threshold value.

6. The method according to claim 5, comprising a step of determining an upper limit, in terms of operating point, of a compatibility of the combination of the input filter with the variable speed drive.

7. The method according to claim 5, comprising a step of determining a lower limit, in terms of operating point, of a compatibility of the combination of the input filter with the variable speed drive.

8. The control system for verifying the compatibility between an input filter and a variable speed drive, said variable speed drive being connected to an electric power source via said input filter, said variable speed drive comprising, at input, a rectifier stage connected to said input filter, a DC power supply bus connected to said rectifier stage and receiving a DC supply voltage, and, at output, an inverter stage connected to the DC power supply bus and controlled so as to supply a variable voltage to an electric motor, said system configured to apply a plurality of successive commands so as to define a plurality of operating points of the electric motor and wherein:

for each operating point:
means for measuring the DC voltage of the bus,
a module for comparing the maximum variation in the amplitude of the DC voltage measured for said operating point with a threshold value,
a module for determining a new operating point as long as said maximum variation in the amplitude of the DC voltage is lower than said threshold value,
a module for determining an operating range comprising all of the operating points for which said maximum variation in the amplitude of the DC voltage is lower than said threshold value.

9. The system according to claim 8, wherein a module for applying a control path that makes it possible to define said operating points.

10. The system according to claim 9, wherein said control path follows successive increments, each increment making it possible to define a separate operating point.

11. The system according to claim 9, wherein said control path is a reference motor frequency path.

12. The system according to claim 8, wherein a module for determining a new operating point on the basis of a difference between the maximum variation in the amplitude of the DC voltage measured for said operating point and the threshold value.

13. The system according to claim 12, wherein a module for determining an upper limit, in terms of operating point, of a compatibility of the combination of the input filter with the variable speed drive.

14. The system according to claim 12, wherein a module for determining a lower limit, in terms of operating point, of a compatibility of the combination of the input filter with the variable speed drive.

* * * * *